United States Patent
Koga et al.

(10) Patent No.: US 8,543,275 B1
(45) Date of Patent: Sep. 24, 2013

(54) CONTROL DEVICE, CONTROL METHOD, AND ELECTRIC MOTOR CAR

(75) Inventors: Takeru Koga, Tokyo (JP); Masayuki Nogi, Tokyo (JP); Hirotoshi Kawai, Tokyo (JP); Satoshi Koizumi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/561,281

(22) Filed: Jul. 30, 2012

(30) Foreign Application Priority Data

Mar. 16, 2012 (JP) ................................ P2012-060063

(51) Int. Cl.
*B60L 11/00* (2006.01)
*H02P 3/00* (2006.01)

(52) U.S. Cl.
USPC .............................. 701/22; 318/139; 318/376

(58) Field of Classification Search
USPC .................. 701/22; 105/61; 104/288, 289; 318/375, 376, 378, 139, 400.11, 430, 431, 318/443, 685; 180/65.1, 65.23, 65.26, 65.28, 180/65.285, 65.29
See application file for complete search history.

(56) References Cited

U.S. PATENT DOCUMENTS

| 4,795,859 | A | * | 1/1989 | Kato et al. ........................ 191/4 |
| 5,059,887 | A | * | 10/1991 | Iida et al. ....................... 323/222 |
| 5,806,010 | A | * | 9/1998 | Sawada ............................ 701/70 |
| 8,253,356 | B2 | * | 8/2012 | Itoh et al. ....................... 318/139 |
| 2005/0264245 | A1 | * | 12/2005 | Donnelly ....................... 318/139 |
| 2007/0093359 | A1 | * | 4/2007 | Kobayashi et al. ............ 477/107 |
| 2011/0166736 | A1 | * | 7/2011 | Kitanaka ......................... 701/22 |
| 2012/0035017 | A1 | * | 2/2012 | Nagai ............................. 477/32 |

FOREIGN PATENT DOCUMENTS

| JP | 2001-352607 A | | 12/2001 |
| JP | 2012182912 A | * | 9/2012 |

* cited by examiner

*Primary Examiner* — Mary Cheung
*Assistant Examiner* — Rodney Butler
(74) *Attorney, Agent, or Firm* — Holtz, Holtz, Goodman & Chick, PC

(57) ABSTRACT

A control device for an electric motor car comprising: a switch which is installed between a power supply source and a power line drawn through the electric motor car; a battery which supplies power to a main motor of the electric motor car; a step-up unit, which is installed between the power line and the battery, configured to increase a voltage; and a control unit which breaks a connection between the power supply source and the power line using the switch when braking the electric motor car, increases the power supplied from the battery using the step-up unit, and performs regenerative braking in the main motor to which the increased power is supplied.

16 Claims, 4 Drawing Sheets

CONTROL DEVICE, CONTROL METHOD, AND ELECTRIC MOTOR CAR

CROSS-REFERENCE TO RELATED APPLICATIONS

This application is based upon and claims the benefit of priority from the prior Japanese Patent Application No. 2012-060063, filed on Mar. 16, 2012, the entire contents of which are incorporated herein by reference.

FIELD

Embodiments described herein generally relate to a control device, a control method, and an electric motor car.

BACKGROUND

In an electric motor car which runs on an electric power supply from a power source such as an overhead contact line, a main motor is activated as a generator and a regenerated current from the generator is returned to the overhead contact line etc. Thereby, a regenerative brake control, which has same function with a status where a car is braked, is used.

Further, in recent years, a battery may be mounted on the conventional electric motor car. In this kind of electric motor car, batteries are respectively installed in plural trailer cars constituting the electric motor car. The respective batteries mounted on the respective trailer cars in a distributed state are connected in parallel to each other through a power line, and the power line is drawn through the train. At this time, since the battery voltage is too low with respect to the driving performance of the vehicle, the battery voltage is increased to a high voltage by a step-up chopper installed inside the vehicle when the vehicle starts to run. That is, the step-up chopper applies a battery voltage increased up to a rated voltage necessary for an inverter that generates power for driving the motor. Such a technology of driving the electric motor car through the power line and the step-up chopper has been proposed. The above mentioned technology is disclosed in Japanese Patent Application Laid-Open No. 2001-352607, and contents of which are hereby incorporated by reference. Further, when the regenerated current is generated from the main motor, drive control of decreasing the main circuit voltage and returning the regenerated current to the battery are performed.

DETAILED DESCRIPTION

In the above-described electric motor car, the battery voltage is designed to be lower than the voltage of the overhead contact line in many cases in order to receive power from the overhead contact line.

In the electric motor car having such a conventional battery, the regeneration efficiency of the main motor is defined by the main circuit voltage in the regenerative brake control when the main motor rotates at a high speed. Accordingly, when the necessary brake force exceeds the electric brake force which may be regenerated based on the main circuit voltage, the brake force necessary for stopping or decelerating the vehicle is not sufficiently obtained. As a result, there is a need to use an air brake. When the air brake is used, energy is wasted due to the heat generation, which causes a problem that the regeneration efficiency decreases.

In view of the above circumstances, an aspect of embodiments provides a control device for an electric motor car comprising: a switch which is installed between a power supply source and a power line drawn through the electric motor car; a battery which supplies power to a main motor of the electric motor car; a step-up unit, which is installed between the power line and the battery, configured to increase a voltage; and a control unit which breaks a connection between the power supply source and the power line using the switch when braking the electric motor car, increases the power supplied from the battery using the step-up unit, and performs regenerative braking in the main motor to which the increased power is supplied.

According to an aspect of embodiments, the electric motor car control device which improves the regeneration efficiency is provided.

First Embodiment

Figure 1:
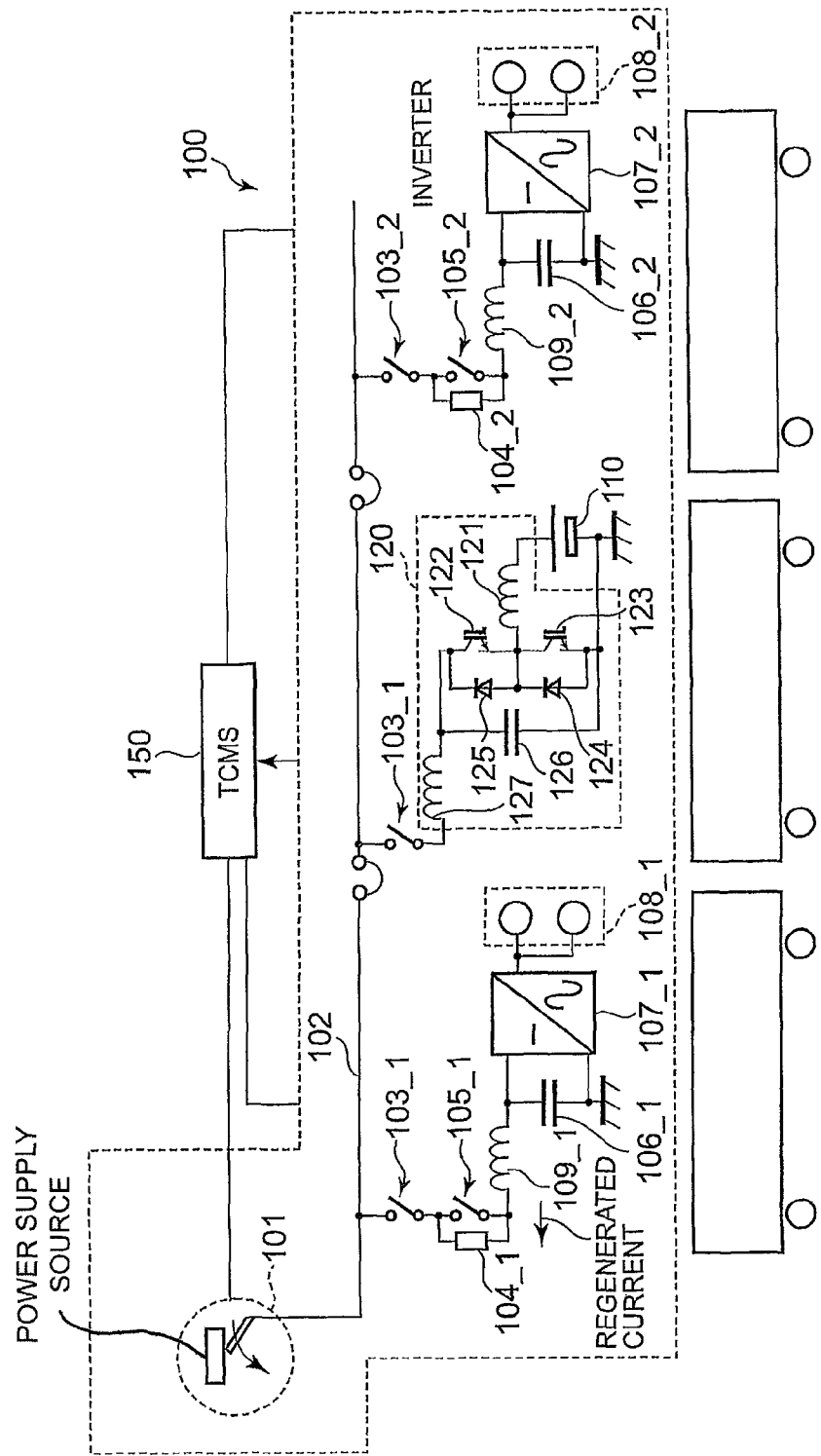
FIG. 1 is a diagram illustrating a configuration of a main circuit of an electric motor car control device of an electric motor car according to a first embodiment.

FIG. 1 is a diagram illustrating a configuration of a main circuit of an electric motor car control device 100 of an electric motor car according to a first embodiment. As illustrated in FIG. 1, the electric motor car control device 100 receives power by connecting a contactor 101 to a power supply source (not illustrated) (for example, an overhead contact line, a third rail, or the like). Then, the electric motor car control device 100 is connected to a power line 102 through the contactor 101 from the overhead contact line.

The contactor 101 is installed between the overhead contact line and the power line 102 which is drawn through the electric motor car, and is controlled by a train control management system (hereinafter, referred to as a TCMS) 150 so that the contactor 101 is connected to or disconnected from the overhead contact line.

Then, the power line 102 is connected to the respective constituents such as an inverter and a charger through high-speed breakers 103_1, 103_2, and 103_3. Then, the electric motor car control device 100 includes the train control management system (TCMS) 150.

The TCMS 150 controls the respective constituents of the electric motor car control device 100. For example, the TCMS 150 may control the contactor 101 or a step-up/step-down chopper 120. Further, the TCMS 150 may realize the regenerative braking using main motors 108_1 and 108_2. Furthermore, as illustrated in FIG. 1, the electric motor car control device 100 is placed on a carriage, and main motors 108_1 and 108_2 are mechanically connected to vehicle wheels so as to apply a drive force or a brake force thereto.

In the embodiment, the voltage of the power which is supplied from the overhead contact line to the power line 102 is exemplified as 600 V, but the voltage value is not limited thereto, and the appropriate voltage may be supplied in accordance with the embodiment.

Further, in the electric motor car control device 100 according to the embodiment, a resistor 104_1, a switching element 105_1, a reactor 109_1, a capacitor 106_1, an inverter 107_1, and the main motor 108_1 are connected to the power line 102 through the high-speed breaker 103_1.

When the inverter 107_1 performs a power running operation by the power supplied from the battery 110, the TCMS 150 does not operate the step-up/step-down chopper 120, and the power supplied from the battery 110 reaches the power line 102 through a diode 125. Accordingly, when the battery voltage is DC 600 V, the voltage of the power line 102 also becomes DC 600 V.

Then, the TCMS 150 performs control in which the switching element 105_1 is turned off and the resistor 104_1 and the capacitor 106_1 are connected in series to each other so as to charge the capacitor 106_1. After the capacitor 106_1 is charged, the switching element 105_1 is turned on, and power is supplied to the capacitor 106_1 and the inverter 107_1 connected in parallel to each other. The power supply target is not limited to the battery 110, and may be the overhead contact line.

Then, when using the electric brake, the electric motor car control device 100 allows the main motor 108_1 to serve as a generator, so that kinetic energy is converted into electric energy. Accordingly, a regenerated current Ireg flows to the power line 102.

Further, in the electric motor car control device 100 according to the embodiment, a resistor 104_2, a switching element 105_2, a reactor 109_2, a capacitor 106_2, an inverter 107_2, and the main motor 108_2 are connected to the power line 102 through the high-speed breaker 103_2 so as to perform the above-described operation.

Further, in the electric motor car control device 100 according to the embodiment, the battery 110 and the step-up/step-down chopper 120 are connected to the power line 102 through the high-speed breaker 103_3.

The battery 110 supplies power to the main motors 108_1 and 108_2 through the step-up/step-down chopper 120 and the inverters 107_1 and 107_2. Further, the battery 110 may supply power to the TCMS 150 or the respective units inside the electric motor car. Further, the battery 110 is charged by the regenerative braking through the electric brake using the main motors 108_1 and 108_2.

The step-up/step-down chopper 120 is installed between the power line 102 and the battery 110, and includes a reactor 127, a capacitor 126, the diode 125 of the upper arm, an IGBT 122 of the upper arm, a diode 124 of the lower arm, an IGBT 123 of the lower arm, and a reactor 121. Then, the TCMS 150 increases or decreases the power by controlling any one of the IGBT 122 of the upper arm and the IGBT 123 of the lower arm. Accordingly, the power supplied from the battery 110 may be increased or decreased.

As illustrated in FIG. 1, in the electric motor car control device 100 according to the embodiment, the respective inverters 107_1 and 107_2 which drive the main motors 108_1 and 108_2 are connected to the power line 102. Then, the step-up/step-down chopper 120 is connected between the power line 102 and the battery 110.

Then, the electric motor car control device 100 according to the embodiment drives the electric motor car by the power supplied from the battery or the power supplied from the overhead contact line in a power running mode. Further, the electric motor car control device 100 enables the entire regenerative electric brake by increasing the power using the step-up/step-down chopper 120 during the regenerative braking from the high speed. Next, the reason why the voltage is increased will be described.

Figure 2:
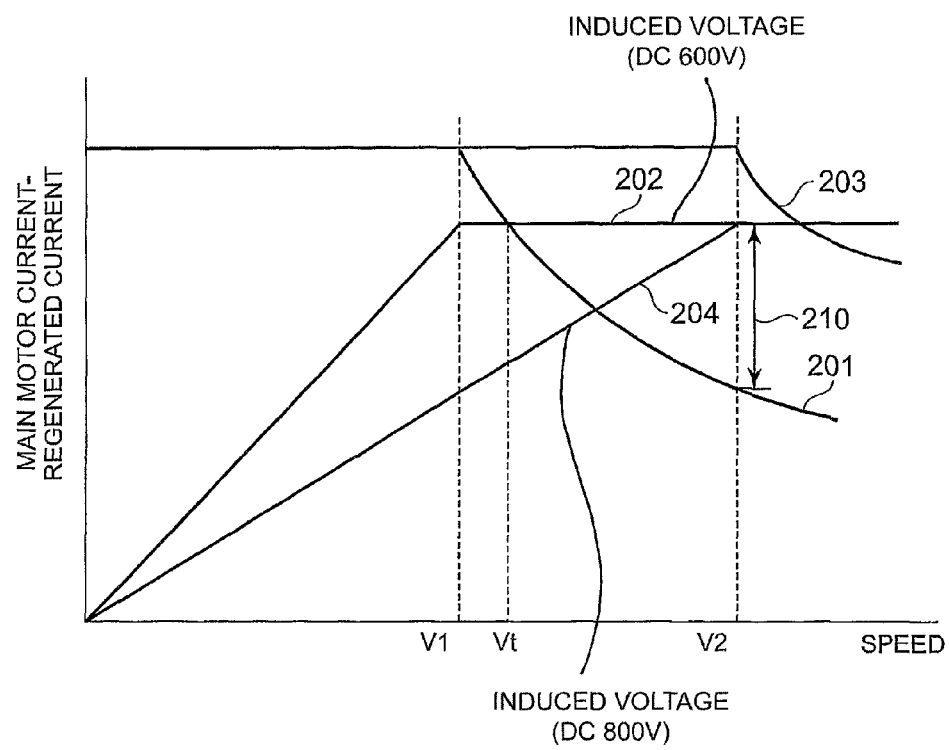
FIG. 2 is a diagram illustrating a relation between a main motor induced voltage and a speed when braking a vehicle.

FIG. 2 is a diagram illustrating a relation between the main motor induced voltage and the speed when braking the vehicle. In FIG. 2, the horizontal axis indicates the speed of the vehicle, and the vertical axis indicates the main motor current value and the regenerated current value. When the voltage of the power line 102 is DC 600 V, the relation may be expressed by a line 201 representing the characteristics of the main motor current and a line 202 representing the regenerated current.

When the step-up/step-down chopper 120 is stopped in the power running mode of the electric motor car, the voltage of the power line 102 becomes the battery voltage according to the battery 110. In the power running mode, the constant torque control is performed up to a speed at which the induced voltages of the main motors 108_1 and 108_2 reach the battery voltage, and the constant torque may not be output at the higher speed. For this reason, the TCMS 150 performs acceleration by the control in which the torque values of the main motors 108_1 and 108_2 are decreased.

Incidentally, in the brake operation, a constant brake force is demanded until the electric motor car stops from the high speed. For this reason, when the brake is operated from the high speed, as illustrated in FIG. 2, the induced voltages of the main motors 108_1 and 108_2 become equal to or larger than the battery voltage of the battery, so that the control may not be performed.

For example, when the brake is operated at the speed V2 of the vehicle, the supplement corresponding to a difference in current 210 is needed using the air brake when the voltage of the power line 102 is DC 600 V.

For this reason, there is a need to increase the voltage of the power line 102 in order to enable the control using the entire electric brake. Therefore, the electric motor car control device 100 according to the embodiment changes the power line voltage, through the power running operation and the regeneration operation, by performing the charge control to the battery 110 of the step-up/step-down chopper 120.

For example, when the voltage of the power line 102 is increased to DC 800 V, a relation is obtained between a line 203 representing the characteristics of the main motor current and a line 204 representing the regenerated current. Due to such a relation, there is no need to use the air brake even at the speed V2 of the vehicle.

In other words, in the electric motor car control device 100 according to the embodiment, since the region where the constant current flows in the main motor current is widened by increasing the voltage of the power line 102 to DC 800 V, entire kinetic energy may be recycled by the electric brake through the regeneration operation using the entire electric brake when braking the electric motor car. However, since the overhead contact line connected to the power line 102 is DC 600 V, the power line 102 may not be increased to DC 800 V while being connected to the overhead contact line.

Therefore, in the embodiment, the TCMS 150 activates the main motors 108_1 and 108_2 as the generator, the contactor 101 is controlled so that the connection to the overhead contact line is interrupted when performing regenerative braking using the electric brake. After the interruption, the TCMS 150 controls the step-up/step-down chopper 120 so that the power supplied from the battery is increased and hence the voltage of the power line 102 is increased to DC 800 V.

Then, the current Ireg which is regenerated by the electric brake (the regenerative braking) flows as a charging input current to the step-up/step-down chopper 120. At this time, the TCMS 150 controls the step-up/step-down chopper 120 in a step-down mode, and charges the battery 110 of DC 600 V by decreasing the voltage from DC 800 V to DC 600 V.

As illustrated in FIG. 2, in a case of the speed V1 of the vehicle, entire kinetic energy of the vehicle may be recycled by the electric braking even at DC 600 V through the regenerative braking using the electric brake. Therefore, the TCMS 150 may perform control so that the voltage of the power line 102 is changed in response to the speed of the vehicle.

In the embodiment, the TCMS 150 determines whether the voltage is increased by the step-up/step-down chopper 120 based on whether the speed is equal to or faster than the reference speed Vt when enabling the electric brake. For example, when it is determined that the speed of the vehicle is equal to or faster than the reference speed Vt, the TCMS 150 controls the step-up/step-down chopper 120 so that the power supplied from the battery 110 is increased to DC 800 V. The reference speed indicates a speed in which the value of the regenerated current when enabling the electric brake by the battery voltage of the battery 110 becomes equal to or larger than the value of the current flowing to the main motors 108_1 and 108_2.

In fact, since the torque values of the main motors 108_1 and 108_2 are small when activating the electric brake, the regenerated current also decreases. For this reason, even at the speed equal to or faster than the reference speed Vt, the regenerative braking may be performed by the electric brake using DC 600 V. In other words, in the region below the boundary line 201 illustrated in FIG. 2, the regenerative braking may be performed by the electric brake using DC 600 V.

Therefore, in the embodiment, when it is determined that the speed is equal to or faster than the reference speed Vt, the TCMS 150 first starts the regenerative braking using the electric brake at DC 600 V. Then, the TCMS 150 may control the contactor 101 so that the connection to the overhead contact line is interrupted and the voltage is increased by the step-up/step-down chopper 120 before the regenerated current exceeds the boundary line 201 of FIG. 2.

Then, when the contactor 101 is connected to the overhead contact line again so as to enable the power running mode of the vehicle, the TCMS 150 detects an overhead contact line voltage using an overhead contact line voltage detection unit (not illustrated), matches the voltage of the power line 102 to the overhead contact line voltage, and connects the contactor 101 thereto.

Further, since there is no need to perform the switching using the step-up/step-down chopper 120 in the power running mode, it is possible to suppress a loss caused by the switching using the step-up/step-down chopper 120.

Figure 3:
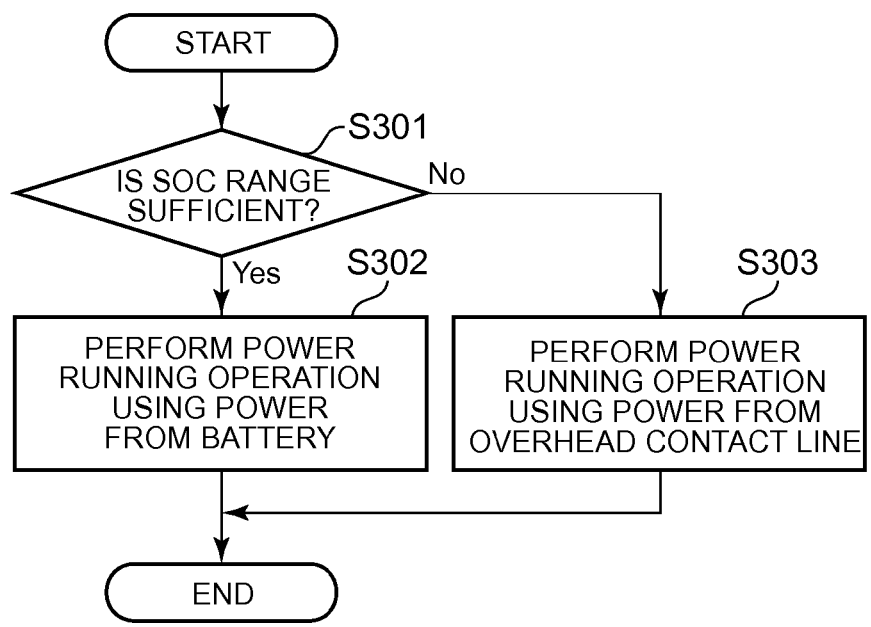
FIG. 3 is a flowchart illustrating a procedure of a process in a power running mode of the electric motor car in the electric motor car control device according to the first embodiment.

Next, the power running operation of the electric motor car in the electric motor car control device 100 according to the embodiment will be described. FIG. 3 is a flowchart illustrating the above-described procedure in the electric motor car control device 100 according to the embodiment.

First, the TCMS 150 of the electric motor car control device 100 determines whether the range of a state of charge (hereinafter, referred to as an SOC) of the battery 110 is sufficient (for example, a full charged value, a predetermined value or more, and the like) (step S301).

When it is determined that the range of the SOC of the battery 110 is sufficient (Yes in step S301), the TCMS 150 supplies the power supplied from the battery 110 to the inverters 107_1 and 107_2 so as to drive the main motors 108_1 and 108_2, whereby the power running operation of the vehicle is performed (step S302).

On the other hand, when it is determined that the range of the SOC of the battery 110 is not sufficient (No in step S301), the TCMS 150 drives the main motors 108_1 and 108_2 by the power supplied from the overhead contact line connected through the contactor 101, whereby the power running operation of the vehicle is performed (step S303).

Figure 4:
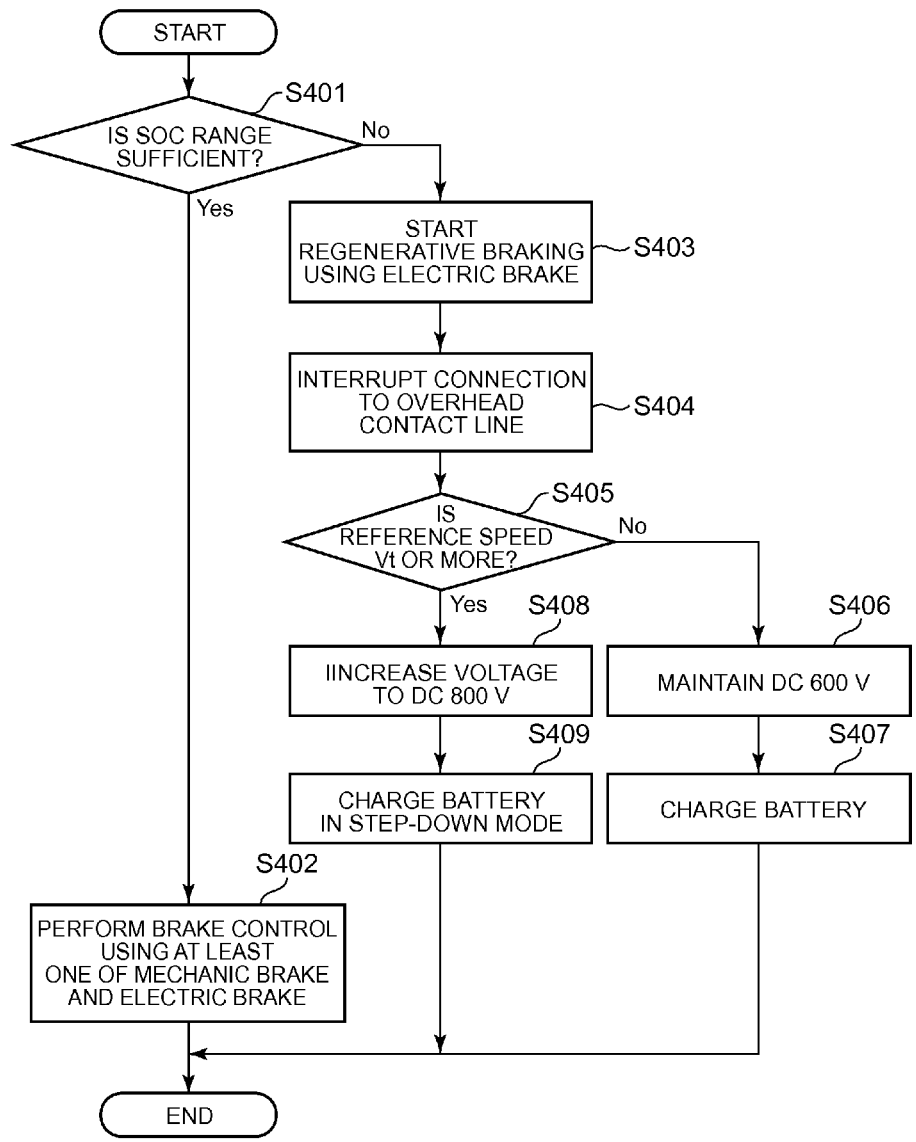
FIG. 4 is a flowchart illustrating a procedure of a process in a stop mode of the vehicle in the electric motor car control device according to the first embodiment.

Next, the process when stopping the vehicle in the electric motor car control device 100 according to the embodiment will be described. FIG. 4 is a flowchart illustrating the above-described procedure in the electric motor car control device 100 according to the embodiment.

When the brake is enabled, the TCMS 150 of the electric motor car control device 100 determines whether the range of the SOC of the battery 110 is sufficient (for example, a full charged value or a predetermined value or more) (step S401).

When it is determined that the range of the SOC of the battery 110 is sufficient (Yes in step S401), the TCMS 150 maintains the connection to the overhead contact line using the contactor 101, and the TCMS 150 performs the brake control by using any one or more of the air (mechanic) brake and the electric brake (step S402). The regenerated current which is generated by the electric brake is returned to the overhead contact line. Alternatively, a heat radiation process may be performed as heat through a resistor or the like.

On the other hand, when the TCMS 150 determines that the range of the SOC of the battery 110 is not sufficient (No in step S401), the TCMS 150 first activates the main motors 108_1 and 108_2 as the generator so as to start the regenerative braking using the electric brake (step S403). Subsequently, the TCMS 150 controls the contactor 101 so that the connection between the overhead contact line and the power line 102 is interrupted (step S404).

Subsequently, the TCMS 150 determines whether the speed of the vehicle is equal to or faster than the reference speed which may be controlled by the electric brake using DC 600 V illustrated in FIG. 2 (step S405). Furthermore, the reference speed is set to a predetermined speed, and in the embodiment, the reference speed is set to the reference speed Vt illustrated in FIG. 2.

When it is determined that the speed is slower than the reference speed Vt which may be controlled by the electric brake (No in step S405), the TCMS 150 maintains the power line 102 at DC 600 V, normally turns on the IGBT 122, and normally turns off the IGBT 123 (step S406). Accordingly, the TCMS 150 does not increase or decrease the voltage using the step-up/step-down chopper 120, but performs the regenerative braking through the electric brake using the main motors 108_1 and 108_2, so that the battery 110 is charged by the regenerated current without causing a switching loss (step S407).

On the other hand, when it is determined that the speed is equal to or faster than the reference speed Vt which may be controlled by the electric brake (Yes in step S405), the TCMS 150 increases the voltage of the power line 102 to DC 800 V by using the step-up/step-down chopper 120 (step S407). The regenerative braking through the electric brake using the main motors 108_1 and 108_2 at DC 800 V is started. Then, after the regenerative braking using DC 800 V is started, the TCMS 150 decreases the inflowing regenerated current to DC 600 V in the step-down mode of the step-up/step-down chopper 120 and charges the battery 110 (step S409).

Further, the TCMS 150 according to the embodiment performs control in which the voltage of the power line 102 is increased to a high voltage by using the step-up/step-down chopper 120 as described above during the regeneration. Incidentally, when the inverters 107_1 and 107_2 transfer the regenerated energy to the power line 102, the voltage of the power line 102 increases in a state where there is no portion receiving the regenerated energy. Therefore, in order to maintain the increasing voltage at the reference voltage of the high voltage (in the embodiment, DC 800 V), the TCMS 150 performs control in which the charging current to the battery 110 is increased when the voltage of the power line 102 becomes larger than the reference voltage and the charging current to the battery 110 is decreased when the voltage becomes smaller than the reference voltage.

Furthermore, in the embodiment, an example has been described in which the voltage is increased to 800 V, but the increased voltage value is not limited thereto. For example, the increased voltage may have a voltage value which may be used for the regenerative braking using the electric brake without using the air (mechanic) brake.

In the embodiment, since entire kinetic energy may be recycled by performing the regenerative braking using the entire electric brake without using the air brake when charging the battery 110, the efficiency of the energy may be improved.

In the electric motor car control device 100 according to the embodiment, since the on-off control of the IGBTs 122 and 123 of the step-up/step-down chopper 120 is not performed in the power running mode, the loss of the charging unit may be reduced.

Modified Example 1

Further, when the power line 102 does not need to be normally maintained at DC 800 V during the regenerative braking and for example, the speed of the vehicle is slower than the reference speed Vt, the TCMS 150 may return the voltage of the power line 102 to DC 600 V by using the step-up/step-down chopper 120.

When the voltage of the power line 102 is returned to DC 600 V, the TCMS 150 may control the contactor 101 so that the overhead contact line and the power line 102 are connected to each other. In this case, the regenerated current may be returned to the overhead contact line.

Modified Example 2

Further, in the embodiment, an example has been described in which the determination is performed based on whether the speed is the reference speed Vt. However, a table illustrating the correlation between the speed of the vehicle and the regenerated current (or the main motors 108_1 and 108_2) for each voltage of the power line 102 indicated by FIG. 2 is stored in a storage unit (not illustrated), and the TCMS 150 may determine whether to perform a step-up operation by referring to the table.

In the modified example 2, the TCMS 150 performs the step-up/step-down control using the step-up/step-down chopper 120 in response to the correlation between the speed of the vehicle and the regenerated current, that is, whether the speed is included in the speed region which is defined by the boundary line 201 of FIG. 2. Accordingly, the more specific regenerative braking may be realized.

Modified Example 3

In the above-described embodiment, an example has been described in which the voltage in the power running mode of the vehicle is the battery voltage. However, the voltage in the power running mode is not limited to the battery voltage of the battery 110. Therefore, in the modified example 3, the TCMS 150 performs a step-up operation using the step-up/step-down chopper 120 in the power running mode.

That is, the TCMS 150 increases the voltage of the power line 102 in the power running mode by increasing the voltage using the step-up/step-down chopper 120 in the power running mode. Accordingly, the power running performance may be improved.

The electric motor car control device 100 according to the above-described embodiment and the above-described modified examples drives the vehicle by the battery voltage in the power running mode. However, since the voltage is increased to the high voltage by the step-up/step-down chopper 120 during the electric braking (the regenerative braking) from the high speed, the entire regenerative electric braking may be performed. Accordingly, entire kinetic energy is converted into electric energy, so that it may be returned to the battery 110. Accordingly, the regeneration efficiency improves.

Incidentally, in the related art, when the battery mounted on the battery driven electric motor car is mounted with a sufficient capacity, the mounting space needs to be ensured and the weight is very heavy, which causes a big burden. Therefore, it is very important to efficiently use the energy of the battery.

Therefore, in the electric motor car control device 100 according to the above-described embodiment and the above-described modified examples, the high regeneration efficiency is realized with the above-described configuration, whereby the mounted battery amount may be decreased.

Some embodiments of the invention have been described, but the embodiments are merely examples and do not limit the scope of the invention. The novel embodiments may be realized as various embodiments, and various omissions, substitutions, and changes may be performed within the scope not departing from the spirit of the invention. The embodiments or the modifications are included in the scope or the spirit of the invention, and are included in the invention disclosed in claims and the equivalents thereto.

For example, in an example of the embodiment, the contactor enables or disables the connection of the overhead contact line to the power line drawn through the electric motor car. However, the invention is not limited to the contactor, and a semiconductor switch may be used. Further, the equivalents may be used. Furthermore, any unit capable of performing the electric connection and disconnection may be used.

As the unit of increasing or decreasing the power supplied from the battery, the step-up/step-down chopper is used in the embodiment of the specification. However, the invention is not limited to the step-up/step-down chopper, and the function of the inverter may be used as described in the paragraph '0051'. Further, the equivalents may be used, and any unit capable of increasing or decreasing the voltage may be used.

What is claimed is:

1. A control device for an electric motor car comprising:
   a switch which is installed between a power supply source and a power line drawn through the electric motor car;
   a battery which supplies power to a main motor of the electric motor car;
   a step-up unit which is installed between the power line and the battery, and which is configured to increase a voltage supplied from the battery; and
   a control unit which, when a regenerative breaking to brake the electric motor car is used and when a speed of the electric motor car is faster than a reference speed, breaks a connection between the power supply source and the power line using the switch, and increases the voltage supplied from the battery by instructing the step-up unit to perform a step-up operation so as to expand an effective range of the regenerative braking.

2. The control device according to claim 1, wherein the control unit does not instruct the step-up unit to perform the step-up operation when the speed of the electric motor car is slower than the reference speed.

3. The control device according to claim 2, wherein the reference speed is a speed at which a value of a regenerated current, when performing electric braking using a battery voltage of the battery, is equal to or larger than a value of a current flowing to the main motor.

4. The control device according to claim 1, further comprising a storage unit which stores correlation information between the reference speed and a regenerated current,
wherein the control unit determines whether to instruct the step-up unit to perform the step-up operation in accordance with the correlation information stored in the storage unit.

5. The control device according to claim 1, wherein the control unit controls a voltage of the power line at a battery voltage of the battery in a power running mode, and after a regeneration operation is started by braking the electric motor car, the control unit breaks the connection between the power supply source and the power line using the switch and instructs the step-up unit to perform the step-up operation.

6. The control device according to claim 1, wherein the control unit increases a voltage of the power line by using the step-up unit in a power running mode of the electric motor car using the battery.

7. A control method of controlling an electric motor car, the electric motor car including (i) a power line which is connected to an external power supply source and which is drawn through the electric motor car, and (ii) a battery which supplies power to a main motor of the electric motor car, the control method comprising:
when using regenerative braking to brake the electric motor car and when a speed of the electric motor car is faster than a predetermined speed, (i) interrupting a connection between the power supply source and the power line, and (ii) increasing a voltage supplied from the battery so as to expand an effective range of the regenerative braking.

8. The control method according to claim 7, wherein when the speed of the electric motor car is slower than the predetermined speed, the voltage supplied from the battery is not increased, and the battery is charged by the regenerative braking of an electric brake using the main motor.

9. The control method according to claim 7, further comprising:
controlling a voltage of the power line at a battery voltage of the battery in a power running mode, and
after a regeneration operation is started by braking the electric motor car, interrupting the connection between the power supply source and the power line and increasing the voltage supplied from the battery.

10. The control method according to claim 9, further comprising:
determining whether the battery is charged to a predetermined value, and
starting the regenerative braking of an electric brake when the battery is not charged to the predetermined value.

11. An electric motor car comprising:
a switch which is installed between an external power supply source and a power line drawn through the electric motor car;
a battery which supplies power to a main motor;
a step-up unit which is installed between the power line and the battery, and which is configured to perform a step-up operation;
a control unit which, when using regenerative braking to brake the electric motor car and when a speed of the electric motor car is faster than a reference speed, interrupts a connection between the power supply source and the power line using the switch, and increases the power supplied from the battery using the step-up unit so as to expand an effective range of the regenerative braking; and
a carriage on which at least one of the battery and the control unit is provided.

12. The electric motor car according to claim 11, wherein when the speed of the electric motor car is slower than the reference speed, the control unit does not increase the power supplied from the battery using the step-up unit.

13. The electric motor car according to claim 11, wherein the control unit controls a voltage of the power line at a battery voltage of the battery in a power running mode, and after a regeneration operation is started by braking the electric motor car, the control unit interrupts the connection between the power supply source and the power line using the switch and increases the power supplied from the battery using the step-up unit.

14. A control device for an electric motor car comprising:
a switch which is installed between a power supply source and a power line drawn through the electric motor car;
a battery which supplies power to a main motor of the electric motor car;
a step-up unit which is installed between the power line and the battery, and which is configured to increase a voltage supplied from the battery; and
a control unit which breaks a connection between the power supply source and the power line using the switch when braking the electric motor car, increases the power supplied from the battery using the step-up unit, and performs regenerative braking in the main motor to which the increased power is supplied,
wherein the control unit controls a voltage of the power line at a battery voltage of the battery in a power running mode, and after a regeneration operation is started by braking the electric motor car, the control unit breaks the connection between the power supply source and the power line using the switch and performs a step-up operation using the step-up unit.

15. A control device for an electric motor car comprising:
a switch which is installed between a power supply source and a power line drawn through the electric motor car;
a battery which supplies power to a main motor of the electric motor car;
a step-up unit which is installed between the power line and the battery, and which is configured to increase a voltage supplied from the battery; and
a control unit which breaks a connection between the power supply source and the power line using the switch when braking the electric motor car, increases the power supplied from the battery using the step-up unit, and performs regenerative braking in the main motor to which the increased power is supplied,
wherein the control unit increases a voltage of the power line by using the step-up unit in a power running mode of the electric motor car using the battery.

16. An electric motor car comprising:
a switch which is installed between an external power supply source and a power line drawn through the electric motor car;
a battery which supplies power to a main motor;
a step-up unit which is installed between the power line and the battery, and which is configured to perform a step-up operation;
a control unit which interrupts a connection between the power supply source and the power line using the switch when braking the electric motor car, increases the power supplied from the battery using the step-up unit, and performs regenerative braking in the main motor to which the increased power is supplied; and
a carriage on which at least one of the battery and the control unit is provided,
wherein the control unit controls a voltage of the power line at a battery voltage of the battery in a power running mode, and after a regeneration operation is started by braking the electric motor car, the control unit interrupts the connection between the power supply source and the power line using the switch and performs the step-up operation using the step-up unit.

* * * * *